US009800733B2

United States Patent
Rist et al.

(10) Patent No.: US 9,800,733 B2
(45) Date of Patent: Oct. 24, 2017

(54) METHOD AND SYSTEM FOR ESTABLISHING A TELECOMMUNICATIONS LINK IN ACCORDANCE WITH ALLOCATION INFORMATION

(71) Applicant: Unify GmbH & Co. KG, Munich (DE)

(72) Inventors: Claus Rist, Bochum (DE); Martin Glaser, Bergkamen (DE); Michael Volkmann, Herdecke (DE)

(73) Assignee: Unify GmbH & Co. KG, Munich (DE)

( * ) Notice: Subject to any disclaimer, the term of this patent is extended or adjusted under 35 U.S.C. 154(b) by 0 days.

(21) Appl. No.: 14/893,701

(22) PCT Filed: May 26, 2014

(86) PCT No.: PCT/EP2014/001414
§ 371 (c)(1),
(2) Date: Nov. 24, 2015

(87) PCT Pub. No.: WO2014/187572
PCT Pub. Date: Nov. 27, 2014

(65) Prior Publication Data
US 2016/0127560 A1    May 5, 2016

(30) Foreign Application Priority Data

May 24, 2013    (DE) .......... 10 2013 008 932

(51) Int. Cl.
*G06F 15/16* (2006.01)
*H04M 7/00* (2006.01)
(Continued)

(52) U.S. Cl.
CPC ...... *H04M 7/0057* (2013.01); *H04L 65/1069* (2013.01); *H04L 67/10* (2013.01);
(Continued)

(58) Field of Classification Search
CPC . H04L 67/10; H04L 65/1066; H04L 65/1069; H04M 7/0057; H04M 7/0012
(Continued)

(56) References Cited

U.S. PATENT DOCUMENTS 6,430,176 B1 * 8/2002 Christie, IV ........ H04M 7/0027
370/261
6,567,848 B1 * 5/2003 Kusuda ................ G06Q 20/108
709/219

(Continued)

FOREIGN PATENT DOCUMENTS

DE    10159636 A1    6/2003
EP    1395024 A1    3/2004
WO    9851092 A1    11/1998

OTHER PUBLICATIONS

International Search Report for PCT/EP2014/001414 dated Sep. 2, 2014 (Form PCT/ISA/210) (German).
(Continued)

*Primary Examiner* — Bharat N Barot
(74) *Attorney, Agent, or Firm* — Buchanan Ingersoll & Rooney PC (57) ABSTRACT

Disclosed is a method for establishing a telecommunications link (C1, C2, C3) for a user to whom a first communications terminal (D1) is allocated. According to said method, an allocation information is made available to a control program (100, 22) running on a CTI server (20) for establishing the telecommunications link (C1, C2, C3), in which information a first allocation (72, 92) is defined for the first communications terminal (D1) as specified by the user, said first allocation defining an allocation of a second communications terminal (D3, D4) to the first communications terminal (D1). The telecommunications link (C1, C2, C3) is established by the control program (100, 22) in accordance with the first allocation, using the second communications
(Continued)

terminal (D3, D4) instead of the first communications terminal (D1). The method is characterized in that in the allocation information a second allocation (70, 90) is defined, by which the first communications terminal (D1) is signaled to the control program (100, 22) as being the only terminal used by the user in the telecommunications link established (C1, C2, C3). The invention further provides a corresponding system.

18 Claims, 6 Drawing Sheets (51) Int. Cl.
    *H04L 29/08*     (2006.01)
    *H04L 29/06*     (2006.01)
    *H04M 3/42*     (2006.01)

(52) U.S. Cl.
    CPC ..... *H04M 3/42263* (2013.01); *H04M 7/0015* (2013.01); *H04L 65/1066* (2013.01); *H04M 3/42008* (2013.01); *H04M 3/42323* (2013.01); *H04M 7/0012* (2013.01)

(58) Field of Classification Search
    USPC .................................. 709/217–219, 227–228
    See application file for complete search history.

(56) References Cited

U.S. PATENT DOCUMENTS

| | | | |
|---|---|---|---|
| 6,856,681 B2* | 2/2005 | Janson | H04M 3/42323 370/294 |
| 7,324,528 B2* | 1/2008 | Szlam | H04M 3/42229 709/227 |
| 8,271,618 B1* | 9/2012 | Kridlo | H04L 67/06 709/219 |
| 2003/0103495 A1* | 6/2003 | Rist | H04M 3/42323 370/352 |
| 2010/0115084 A1 | 5/2010 | Caspi et al. | |
| 2013/0028252 A1* | 1/2013 | Booton | H04M 7/0012 370/352 |
| 2014/0040426 A1* | 2/2014 | Glaser | H04L 67/10 709/217 |
| 2016/0094717 A1* | 3/2016 | Rist | H04M 3/42323 379/93.14 |

OTHER PUBLICATIONS

Written Opinion of the International Searching Authority for PCT/EP2014/001414 dated Sep. 2, 2014 (Form PCT/ISA/237).
Written Opinion of the International Searching Authority for PCT/EP2014/001414 dated Sep. 2, 2014 (Form PCT/ISA/237) (English Translation).

* cited by examiner

| Monitored Device | D1 (ONS) | |
|---|---|---|
| Delivered Message | | |
| - Delivered Connection Path | D2/D2C1 | |
| - Ringing Device | D2/D2 | ⎫ 50 |
| - Calling Device | D1/D3 | ⎬ 52 |
| - Called Device | D2 | |
| - Last Forwarding Device | NR | |
| - Local Connection Status | Connected | |
| - Cause | New Call | |

| Activity | MONITORED DEVICE D2 | MONITORED DEVICE D2 | MONITORED DEVICE D2 | MONITORED DEVICE D3 |
|---|---|---|---|---|
| Consultation call service to device D3 is initiated | Consultation call placement request<br>- Existing Call    D1/D4C1<br>- Queried Device    D3 | | 62 | |
| Confirmation | Consultation call result<br>- Initiated Call    D1D4C2 | | | |
| Connection placed on hold | Held Message<br>- Held Connection    D1/D4C2<br>- Holding Device    D1/D4<br>- Local Connection Status    Held Consultation call<br>- Message Cause | | Services and messages<br>- Delivered Message    Connection<br>- Ringing Device    D1/D4C2<br>- Calling Device    D1/D4 Connected Consultation call | |

| Services and Messages | Monitored Device D1 (ONS) | |
|---|---|---|
| Delivered Message<br>- Connection<br>- Ringing Device | D2 C2<br>D2 | D2C1<br>D2 |
| - Calling Device | D1/D3 | D1 |
| - Called Device<br>- Last Forwarding Device<br>- Local Connection Information<br>- Cause | D3<br>NK<br>Connected<br>New Call | D3<br>NK<br>Connected<br>New Call |

BEFORE

AFTER

Fig. 9

| Services and messages | Monitored Device D1 (ONS) | |
|---|---|---|
| Consultation call placement request | | |
| - Existing Call | D1/D4C3 | D1C1 |
| - Queried Device | D3 | D3 |
| Consultation call result | | |
| - Initiated call | D1/D4C4 | D1C2 |
| Held Message | | |
| - Held Connection | D1/D4C3 | D1C1 |
| - Holding Device | D1/D4 | D1 |
| - Local Connection Information | Held | Held |
| - Cause | Consultation Call | Consultation Call |

Fig. 10

| Office number device (ONS) | Preferred Device (PD) |
|---|---|
| ONS device: <br> - Individual station: <br>     - SIP <br>     - HFA <br>     -TDM <br>     - POT <br>     -CMI <br> - MULAP <br> - Mobile access <br> - Only GSM | Internal OND device <br> - Individual station: <br>     - SIP <br>     - HFA <br>     -TDM <br>     - POT <br>     -CMI <br> - MULAP <br> - Mobile access <br> - Only GSM <br> - MULAP-subscriber not permitted <br> - Groups, general calls, UCD: rejected <br>   External OND device: any |

METHOD AND SYSTEM FOR ESTABLISHING A TELECOMMUNICATIONS LINK IN ACCORDANCE WITH ALLOCATION INFORMATION

CROSS-REFERENCE TO RELATED APPLICATIONS

This application is the United States national stage under 35 U.S.C. §371 of PCT International Patent Application No. PCT/EP2014/001414, filed on May 26, 2014, and claiming priority to German patent applicant no. 10 2013 008 932.8, filed on May 24, 2013.

BACKGROUND OF THE INVENTION

Field of the Invention

Embodiments relate to methods and systems for establishing a telecommunication connection for a user to whom a first telecommunication terminal is assigned.

Background of the Related Art

The integration of telecommunication networks and data networks is becoming increasingly important. Telecommunication networks are used primarily for communication by telecommunication subscribers using telecommunication terminals such as telephones. Data networks are used primarily for networking computers, for example PCs with servers. Methods and arrangements whereby applications installed on computers control and monitor communication systems and communication connections are generally known as CTI solutions (CTI=Computer Telephony Integration). Both communication system ports and connections between ports can be controlled and monitored in this manner. The respective connections are temporary communication channels between two or more subscribers on one or more communication systems.

When a CTI solution is operating, data with control and status information are transmitted each time between a communication system and a CTI application (CTI application program). To this end, communication systems have special interfaces for the data exchange: CTI interfaces. The respective applications or PCs likewise have corresponding CTI interfaces for this data exchange. For this, the CTI interfaces of the communication system and those of the application are connected with one another via a data line or a data network. Because the maximum number of CTI interfaces in a communication system is limited, a telephony server is often connected between the communication system and the applications.

The publication WO 98/51092 A1 "Computer Telephony Integration Gateway" shows a public communication network with several communication systems and a private communication network with several domains, each of which features computers with applications for controlling and/or monitoring the public communication network's resources. The arrangement shown features a "CTI gateway" as a conversion device, which changes the type of data sent for controlling and/or monitoring resources from the public communication network to the private communication network, so that these data appear as the data from one single public communication network, and conversely changes the data that are sent by the applications from the private communication network to the public communication network, as though they had been sent from a private communication network with only one application.

DE 101 59 636 B4 describes a method for controlling and/or monitoring resources and connections using the exchange of data between communication systems and at least one application, wherein the data have identifiers that differentiate the resources and the connections, and the identifiers of the resources are converted during the exchange such that they present themselves as the identifier of one single communication system with subscriber connections for the one or for each application, characterized in that each of the identifiers of the connection between resources of different communication systems comprises one local connection number (call ID) of the communication system that participates in the connection and one global connection number (call ID) and in that through the conversion the global connection number (call ID) is transmitted to the application such that it cannot be differentiated by the application from a local connection number (call ID).

Available CTI features already include preferred device applications, with which the user can dynamically set up a terminal (preferred device) on which he can make and receive incoming and outgoing calls from his office number at a preset time, without having to be in the office. This preferred device can be located anywhere and can use nodes in the interconnected network or in the central office.

For example, One Number Service is known to be a preferred device application with OpenScape Voice. In this application, in order to use the features of One Number Service, the application must have complex knowledge about which preferred device the office number is currently connected to.

Similar features are available using the CallMe Service with OpenScape Office. However, in OpenScape Office, features such as consultation calls, call swapping, transfers, call records, etc. are not available through the CallMe Service.

With preferred device applications such as the One Number Service with OpenScape Voice and the CallMe Service with OpenScape Office, the user can dynamically set up a terminal (preferred device) on which he can make and receive incoming and outgoing calls from his office number at a preset time, without having to be in the office. This preferred device can be located anywhere: in its own node, in the interconnected network, or in the central office.

BRIEF SUMMARY OF THE INVENTION

To date, features such as consultation calls, call swapping, transfers, etc. for a preferred device configuration have been handled through CTI in such a way that the application controlling the feature must have knowledge about the preferred device.

In this regard, it would be helpful to have a solution that now allows even high-level applications to run features easily and efficiently through CTI, without complex knowledge of the various—and dynamically modifiable—preferred devices.

Embodiments may provide a method of establishing a telecommunication connection for a user to whom a first communication terminal is assigned, comprising the following steps: a piece of assignment information is made available to a control program running on at least one CTI server for the purpose of establishing the telecommunication connection, and in that information a first assignment is defined for the first communication terminal as specified by the user, with the first assignment defining the assignment of a second communication terminal to the first communication terminal; and the telecommunication connection is established by the control program according to the first assignment, using the second communication terminal instead of the first communication terminal; characterized in that the assignment information defines a second assignment whereby the first communication terminal is reported to the control program as being the only terminal used by the user in the established telecommunication connection.

DETAILED DESCRIPTION OF THE INVENTION

As previously noted, embodiments may provide a method of establishing a telecommunication connection for a user to whom a first communication terminal is assigned, comprising the following steps: a piece of assignment information is made available to a control program running on at least one CTI server for the purpose of establishing the telecommunication connection, and in that information a first assignment is defined for the first communication terminal as specified by the user, with the first assignment defining the assignment of a second communication terminal to the first communication terminal; and the telecommunication connection is established by the control program according to the first assignment, using the second communication terminal instead of the first communication terminal; characterized in that the assignment information defines a second assignment whereby the first communication terminal is reported to the control program as being the only terminal used by the user in the established telecommunication connection.

According to a preferred embodiment of the invention, whose features can also be combined with the features of other embodiments of this invention, the at least one CTI server receives input from a user that defines the user's second communication terminal.

According to a preferred embodiment of the invention, whose features can also be combined with the features of other embodiments of this invention, the second communication terminal comprises a preferred device.

According to a preferred embodiment of the invention, whose features can also be combined with the features of other embodiments of this invention, the at least one CTI server calls up a data structure that defines the first assignment for the first communication terminal.

According to a preferred embodiment of the invention, whose features can also be combined with the features of other embodiments of this invention, in the first assignment the second communication terminal is defined together with the first communication terminal.

According to a preferred embodiment of the invention, whose features can also be combined with the features of other embodiments of this invention, the first communication terminal comprises a calling device.

According to a preferred embodiment of the invention, whose features can also be combined with the features of other embodiments of this invention, the first communication terminal comprises a physical communication terminal as specified by the user.

According to a preferred embodiment of the invention, whose features can also be combined with the features of other embodiments of this invention, calls are initiated on the preferred device instead of the physical communication terminal.

According to a preferred embodiment of the invention, whose features can also be combined with the features of other embodiments of this invention, the data structure defines the second assignment, and in the second assignment only the physical communication terminal is defined as a calling device.

According to a preferred embodiment of the invention, whose features can also be combined with the features of other embodiments of this invention, when the control program attempts to initiate a call to the physical communication terminal, the at least one CTI server automatically initiates a call to the preferred device, based on the first assignment, wherein the call made in the control program appears as a call to the physical communication terminal, based on the second assignment.

According to a preferred embodiment of the invention, whose features can also be combined with the features of other embodiments of this invention, in the data structure in the first assignment a first connection ID is defined, and the first connection ID reports a call to the second communication terminal.

According to a preferred embodiment of the invention, whose features can also be combined with the features of other embodiments of this invention, in the data structure in the second assignment a second connection ID is defined, and the second connection ID reports a call to the first communication terminal.

According to a preferred embodiment of the invention, whose features can also be combined with the features of other embodiments of this invention, the first communication terminal and the second communication terminal are dynamically linked.

According to a preferred embodiment of the invention, whose features can also be combined with the features of other embodiments of this invention, the at least one CTI server is configured such that, in response to an instruction from the control program, it runs a CSTA Call Control Service, wherein the data structure in the first representation defines the first communication terminal together with a first connection ID as an existing call and defines the first communication terminal together with a second connection ID as an initiated call, wherein the data structure in the second assignment defines a third connection ID as an existing call and a fourth connection ID as an initiated call, and wherein the third and fourth connection IDs are associated with the first communication terminal and correspond to different calls.

The invention further includes a computer program product or computer program for establishing a telecommunication connection, to be used in executing a method according to one of the preceding claims. The invention further includes a machine-readable data carrier with a computer program product stored on the data carrier.

The invention further includes a system for establishing a telecommunication connection for a user to whom a first communication terminal is assigned, comprising: a CTI server; a first communication terminal assigned to the user; a second communication terminal that can be assigned to the first communication terminal; and a control program running on the CTI server for the purpose of establishing the telecommunication connection, in which a piece of assignment information is generated that defines a first assignment for the first communication terminal as specified by the user, with the first assignment defining the assignment of a second communication terminal to the first communication terminal; wherein the control program is configured such that the telecommunication connection is established by the control program according to the first assignment, using the second communication terminal instead of the first communication terminal. The system is characterized in that the assignment information defines a second assignment, whereby the first communication terminal is reported to the control program as being the only terminal used by the user in the established telecommunication connection.

According to a preferred embodiment of the invention, whose features can also be combined with the features of other embodiments of this invention, the assignment information includes a data structure that defines the first assignment for the first communication terminal, whereby preferably in the first assignment the second communication terminal is defined together with the first communication terminal.

Clearly, the system should preferably be arranged or configured such that the described various ways to execute the method can be carried out. The system therefore includes the features needed to carry out the corresponding steps of the method, even when this is not explicitly shown.

According to a preferred embodiment of the invention, whose features can also be combined with the features of other embodiments of this invention, the at least one CTI server receives input from a user that defines the user's second communication terminal.

According to a preferred embodiment of the invention, whose features can also be combined with the features of other embodiments of this invention, the second communication terminal comprises a preferred device.

According to a preferred embodiment of the invention, whose features can also be combined with the features of other embodiments of this invention, the at least one CTI server calls up a data structure that defines the first assignment for the first communication terminal.

According to a preferred embodiment of the invention, whose features can also be combined with the features of other embodiments of this invention, in the first assignment the second communication terminal is defined together with the first communication terminal.

According to a preferred embodiment of the invention, whose features can also be combined with the features of other embodiments of this invention, the first communication terminal comprises a calling device.

According to a preferred embodiment of the invention, whose features can also be combined with the features of other embodiments of this invention, the first communication terminal comprises a physical communication terminal as specified by the user.

According to a preferred embodiment of the invention, whose features can also be combined with the features of other embodiments of this invention, calls are initiated on the preferred device instead of the physical communication terminal.

According to a preferred embodiment of the invention, whose features can also be combined with the features of other embodiments of this invention, the data structure defines the second assignment, and in the second assignment only the physical communication terminal is defined as a calling device.

According to a preferred embodiment of the invention, whose features can also be combined with the features of other embodiments of this invention, when the control program attempts to initiate a call to the physical communication terminal, the at least one CTI server automatically initiates a call to the preferred device, based on the first assignment, wherein the call appears in the control program as a call to the physical communication terminal, based on the second assignment.

According to a preferred embodiment of the invention, whose features can also be combined with the features of other embodiments of this invention, a first connection ID is defined in the data structure in the first assignment, and the first connection ID reports a call to the first communication terminal.

According to a preferred embodiment of the invention, whose features can also be combined with the features of other embodiments of this invention, a second connection ID is defined in the data structure in the second assignment, and the second connection ID reports a call to the first communication terminal.

According to a preferred embodiment of the invention, whose features can also be combined with the features of other embodiments of this invention, the first communication terminal and the second communication terminal are dynamically linked.

According to a preferred embodiment of the invention, whose features can also be combined with the features of other embodiments of this invention, the at least one CTI server is configured such that, in response to a notification from the control program, it runs a CSTA Call Control Service, wherein the data structure in the first assignment defines the first communication terminal together with a first connection ID as an existing call and defines the first communication terminal together with a second connection ID as an initiated call, wherein the data structure in the second assignment defines a third connection ID as an existing call and a fourth connection ID as an initiated call, and wherein the third and fourth connection IDs are associated with the first communication terminal and correspond to different calls.

The invention provides a method that now allows even high-level applications to run features easily and efficiently through CTI, without complex knowledge of the various— and dynamically modifiable—preferred devices.

The preferred modelling of the current (dynamically modifiable) configuration without a physical representation facilitates the CTI control of preferred device configurations using high-level applications without the complex knowledge of the specific preferred device configuration that has been needed until now. The user can use one or more preferred devices at the same time, without his applications requiring special information about the activation, location (particularly in the IP environment), and type of the current preferred device. This is accomplished by representing or assigning a unique logical CTI device (office number device) with simultaneous control of that device.

This gives the following new features to high-level applications controlling preferred device configurations:
improved user control;
simpler implementation algorithm;
independence of device type (office number device and preferred device);
simultaneous operation of multiple high-level applications is possible;
parallel terminal control operations are possible.

Embodiments are described below in more detail based on preferred exemplary embodiments and with reference to the figures.

Examples of embodiments of the invention are illustrated using appropriately configured CTI-based telecommunication systems, particularly OpenScape Voice or OpenScape Office. Such systems are configured according to the CSTA (Computer-Supported Telephony Applications) standard from ECMA. However, other systems can obviously be used as the basis for implementing the invention.

Unless stated otherwise, any design features of the system, combinations of components, method steps, or other techniques disclosed here with respect to embodiments of this invention can be combined with any or all other design features of the system, combinations of components, method steps, or other techniques disclosed here.

A. Current implementation of OpenScape Voice and OpenScape Office.

Figure 1:
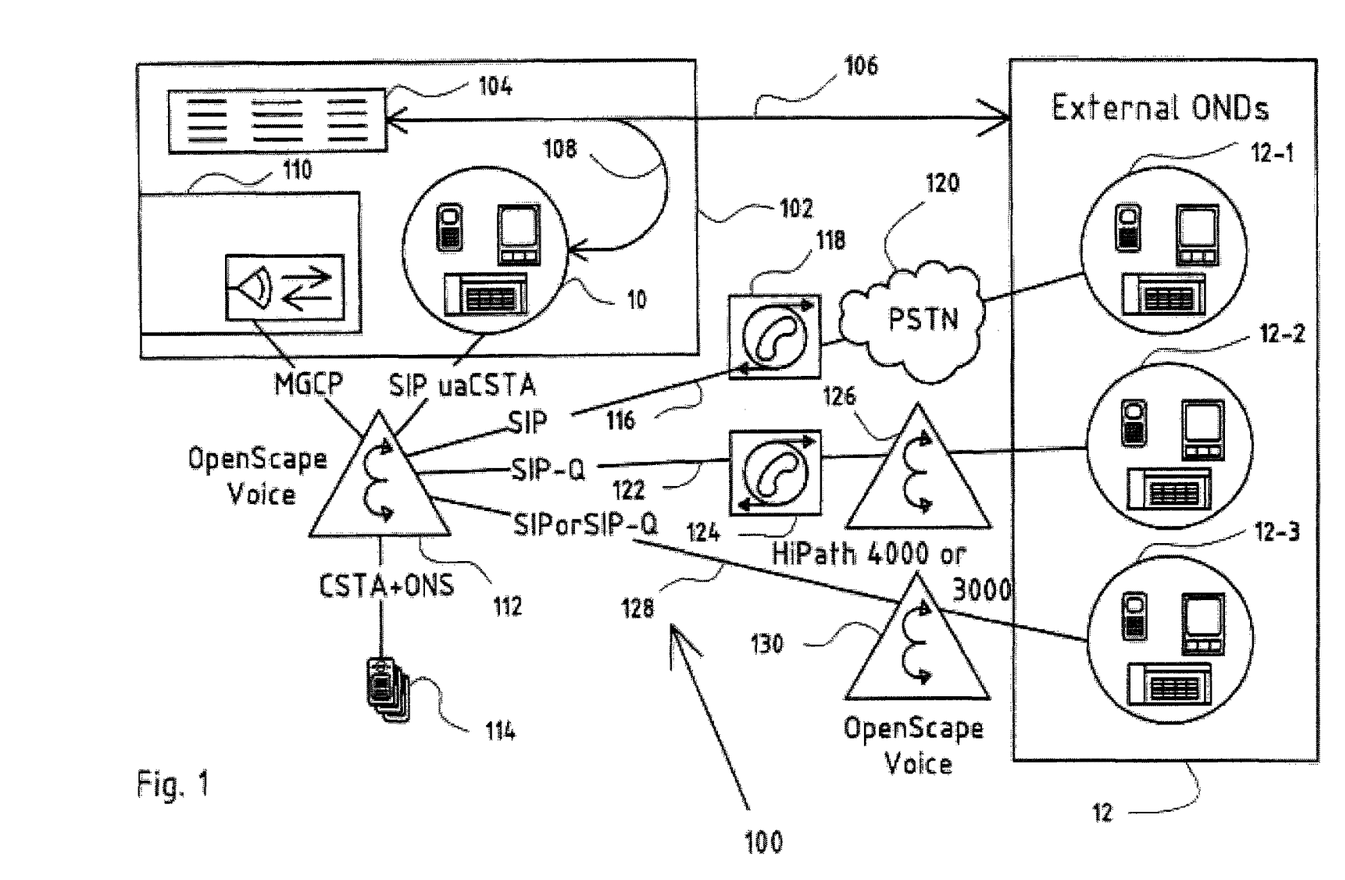
FIG. 1 schematically, a conventional system for implementing a preferred device (One Number Service with OpenScape Voice)
Figure 2:
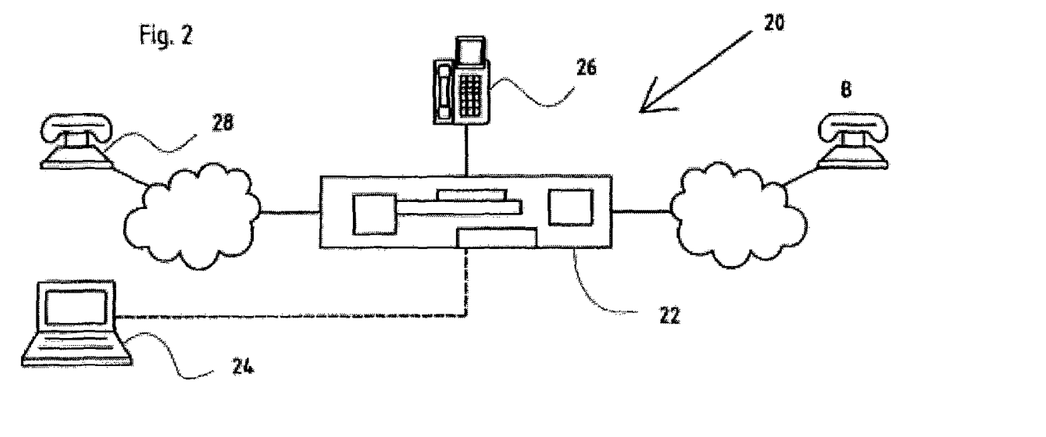
FIG. 2 schematically, another conventional system for implementing a preferred device (CallMe Service with OpenScape Office)

For preferred device applications such as the One Number Service with OpenScape Voice and the CallMe Service with OpenScape Office, the definition of a preferred device is basically the same (see FIG. 1 and FIG. 2).

FIG. 1 shows, schematically, a conventional system for implementing a preferred device corresponding to One Number Service (ONS) with OpenScape Voice (OSV). The telecommunication system 100 includes a control program (subsystem) 102, which is part of the software and in which a number of subscriber IDs 104 are registered as part of the ONS.

They can be for preferred devices, internal One Number Devices (ONDs) 10, or external ONDs 12. External connections 106 can be established between subscriber IDs 104 and external ONDs 12, described in detail below. External ONDs 12 are corresponding associated (non-registered) devices. In addition, internal connections 108 can be established between subscriber IDs 104 and (registered) ONDs 10. The latter can include telephones, MLHQ pilots (a component called "Multiple Hunt Group" in OpenScape Voice or HiPath 8000 from Unify GmbH & Co KG), or OSMO clients (another component in OSV). One Number Service should be run not only with internal devices (internal binding) but also with external devices (hotel phones, mobile phones).

The subsystem 102 includes a media server 110, which implements an MLHG hold queue (MLHG=Multiple Hunt Group, planned for OSV). The media server 110 is used to insert tones or announcements into the call. For application-controlled calls made with SIP terminals, it may be necessary to initiate a ring tone or busy signal, which is done with the media server 110. All calls are made through the media server, which can insert a tone, message, or similar element into the conversation.

The telecommunication system 100 includes a softswitch (software-implemented switch) 112 that is designed for communication with the media server 110 through the MGCP protocol and with the internal ONDs 10 through the SIP or uaCSTA protocol (User Agent CSTA, i.e. CSTA through SIP; see http://wiki.siemens-enterprise.com/wiki/uaCSTA). The softswitch 112 is designed to establish connections with additional devices, as described below in more detail. The softswitch 112 can be used to switch on the SIP terminals through SIP and uaCSTA, internally for ONDs 10, MLHQ devices, OSMO clients, etc.: These are terminals that an OSV can register.

Terminals 114 are connected to the OSV through SIP and uaCSTA, and a UC (unified communication) application that supports the ONS is generated with CSTA and the ONS that is transferred through CSTA. UC (ONS) is an important component of UC, making it possible for a telephone number to be reachable everywhere.

The softswitch 112 makes it possible to generate connections 116 with external ONDs 12-1 using the SIP protocol through a visited gateway 118 and the PSTN 120. Using the SIP-Q protocol through a visited gateway 124, the softswitch 112 also allows connections 122 and the availability of the softswitch 126 with external ONDs 12-2. The softswitch 112 also allows connections 128 using the SIP or SIP-Q protocol and the generation of a second OSV softswitch 130 with external ONDs 12-3.

The existing OpenScape Office, on the other hand, is hardware that can also be configured as a softswitch.

FIG. 2 shows, schematically, another conventional system for implementing a preferred device (CallMe Service with OpenScape Office). In this case OpenScape Office can be configured as hardware or also as a softswitch.

As shown in FIG. 2, the telecommunication system 20 can include a telecommunication connection system or control program (here OpenScape Office, OSO) 22. One or more CTI servers (not shown), a client PC (laptop) 24, or another computer can be used for the telecommunication connection system 22. A user has an ONS device (physical device) 26 in his office. The user also has an ONS device (OND) 28.

Explanations:
ONS—A One Number Subscriber Device (ONS device) 26, that has registered on OpenScape Office (desk phone, office number), is an existing device with a subscriber ID assigned to OpenScape Office.
OND—A One Number Service Device 28 is the suitable device used under the ONS that is active for the ONS while a call is incoming. OND must be a selectable number within the DNS selection plan. OND can be located anywhere, in OpenScape Office, in the network, at the hotel.
Definition: Preferred Device=OND Thus, the ONS device 26 is the office number device and the preferred device (OND) 28 is the device dynamically connected in the respective conversation (dynamic binding). This preferred device 28 can be located anywhere: in its own node, in the interconnected network, or in the central office.

EXAMPLE

User A calls User B using his telephone number 510. If User B has the One Number Service feature activated, User B's telephone number remains 510, but behind that number User B is located in a hotel, for example, or is using a cell phone (OND device 28, internal and external binding). The device can be anywhere, the call goes to the telephone number 510, but the subscriber for telephone number 510 is located somewhere else and wants to receive the call on a device where he is.

To do this, ONS represents the device 26 with the office number and OND 28 the device dynamically connected for that call through dynamic binding.

OpenScape Voice has a 1:n assignment, whereby multiple preferred devices or ONDs 28 are possible for one subscriber at the same time. It is possible to decide which preferred device should be used. OpenScape Office, on the other hand, has a 1:1 assignment, meaning that once a device is selected, it is always used.

Figure 3:
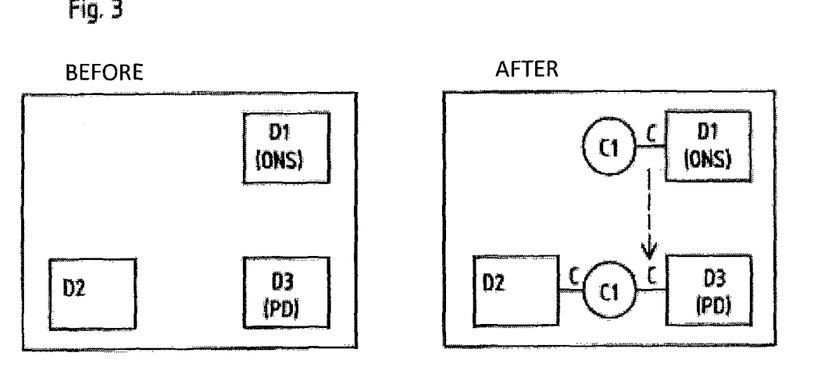
FIG. 3 schematically, the dynamic binding of the call in the system from FIG. 2.

FIG. 3 shows, schematically, the dynamic binding of calls in the system from FIG. 2. If there is no call for the ONS 26, then OND 28 is also not logically connected with the ONS 26. This occurs only when a call is made or received. If the OND 28 is located within the switch 22, the connection can also be made statically. However, if the OND 28 is located outside of the figure shown, the OND 28 must be reached through the trunk. The trunk is the targeted resource, it is determined which trunk is active for the ONS 26, which is referred to as dynamic binding. The preferred device consequently gives the user the identity of the ONS subscriber instead of his own.

Dynamic Binding.

Because of dynamic binding, calls on preferred devices (preferred device 28) use the identity of the ONS subscriber instead of the preferred device. Dynamic binding makes it possible for the user to be recognized on the preferred device 28 with his office number. This applies to both incoming and outgoing calls (see FIG. 3).

In the following example, the user establishes the device D3 as his preferred device 28. Dynamic binding of the office number device (D1) takes place as the call is made to device D2.

The following abbreviations apply here (and hereafter).
C1, C2 . . . Cn Call (call ID)
c Connection status—connected
D1, D2, D3 . . . Dn Subscriber device (device)
D1C1 Connection (connection ID)
ONS One Number Service Subscriber (office number)
OND One Number Service Device
PD Preferred Device
D1 is the ONS, office phone
D2 is the caller
D3 is the preferred device.

If D1 calls D2 or D2 calls D1, then the voice path (among other things) runs between D2 and D3, and because of the application with dynamic binding, D1 is switched into the conversation (whereby the dashed-line arrow in FIG. 3 should show the logical connection between D1 and D3).

As shown in FIG. 3, connections D1C1 and D3C1 are dynamically bound. D1, D2, or D3 is the device, C1 is the call, and the link between them is the connection (see also FIG. 4).

Connection

Figure 4:
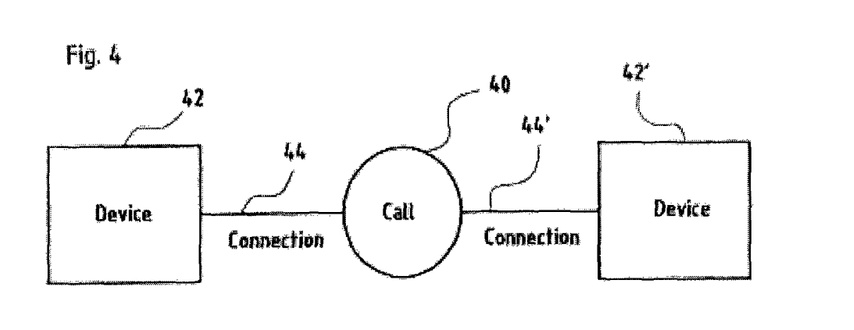
FIG. 4 schematically, the relationships between calls, devices, and connections according to the CSTA standard.

A connection (e.g., D1C1) is a relationship in a determined sub-domain between a CSTA device (D1, D2, D3 . . . Dn) and a call (C1, C2 . . . Cn), in which this CSTA device (D1, D2, D3 . . . Dn) is involved. This connection relationship can be monitored as well as manipulated. FIG. 4 shows the relationships between calls 40, devices 42, 42', and connections 44, 44' according to the CSTA standard. Monitoring and manipulating these connections are the basis for Call Control Services (such as Clear Connection, Answer Call, etc.). Connections are CSTA objects with the following features: Connection IDentifier ("Connection ID").

Every connection that can be monitored and/or controlled is marked in the service area. For this, each connection is assigned a unique identifier by the switching function. This identifier includes a device identifier and a call identifier. For a call there are as many connection identifiers as there are related devices, and for a device there are as many connection identifiers as there are related calls. The connection IDentifier is unique in a sub-domain and in a single service area. It is assigned by the switching function, if either a new call comes in or a new device is involved in a call. A connection identifier can change due to various processes (e.g., transfer or conference), in which case the switching function transfers the corresponding information to the computer function, so it can be transferred from the old identifiers to the new identifiers. The device identifier used in the connection can be assigned either statically or dynamically by the switching function.

B. CSTA Call Control Event Report a) OpenScape Voice

Figures 5, 6A:
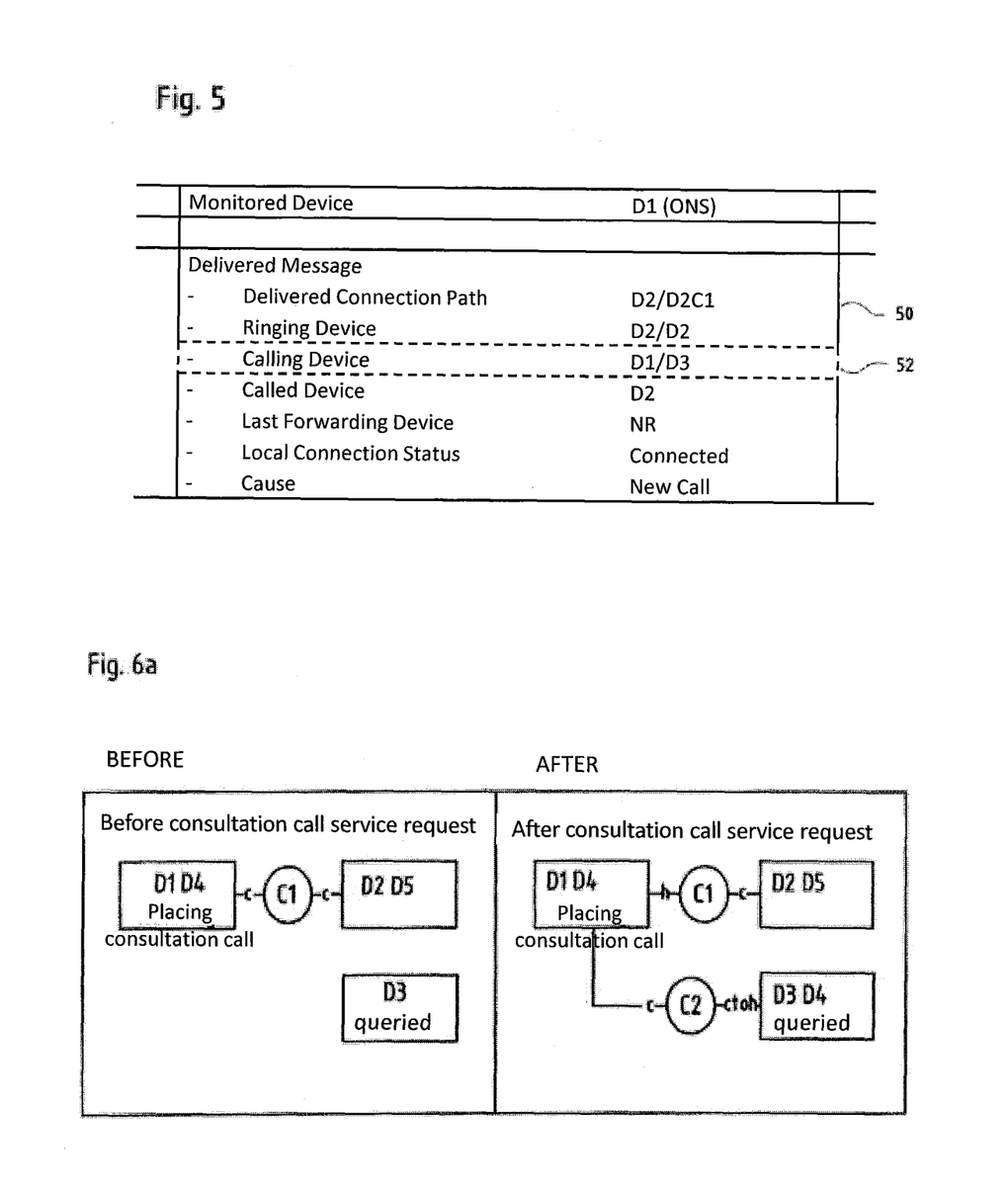
FIG. 5 schematically, a CSTA Call Control Event Report used in the system from FIG. 2.

FIG. 5 shows, schematically, a CSTA Call Control Event Report used in the system from FIG. 2 [source: OpenScape Voice]. The CSTA Event Report 50 corresponds to the content of a data structure in which the relevant device, call, and connection information is stored. The CSTA Event Report 50 for OpenScape Voice on the office number device D1 (ONS) here clearly shows which physical preferred device D3 is currently being used. In FIG. 5 this is represented in field 52 (calling device) by the pipe symbol "|" (=>D1|D3—see FIG. 3).

In CSTA XML, it is shown by a private XML tag:
<callingDevice>N<+14084922343>;ond=+16504001800</callingDevice>

The event report shown in FIG. 5 takes place between OpenScape Voice and the ONS UC application (CSTA plus ONS), as shown at lower left in FIG. 1. The reports are intended for the end user's application. Communication takes place between switch 112 in OpenScape Voice and the UC application in the device 114. This is not shown in the figure, as the application is already included in OpenScape Office.

The dynamic binding of the ONS device D1 with the preferred device D3 is shown in the event report 50 for OpenScape Voice (FIG. 5) as follows: xml-coded.

D1 is the logical device that runs on D3. The calling device is an ONS component. The application therefore knows at any given time to which physical device the ONS device is directly dynamically bound.

D4 is now the preferred device. If the conversation takes place on the preferred device and one wishes to place a consultation call (consultation call request), this occurs through the application, with the client controlling the conversation and the preferred device simultaneously. The application knows that the user D4 has joined the conversation dynamically as a preferred device; it acts as D1 and requests a consultation call. In this case, according to the prior art, the application sends the signal that a consultation call should take place for D1 on device D4.

b) OpenScape Office

A CSTA Event Report on the office number device D1 (ONS) at present does not occur with the CallMe Service for OpenScape Office.

C. CSTA Call Control Services a) OpenScape Voice

For the application, the inventors have established that the application must know at all times what physics lies behind dynamic binding. However, this is complex and is too expensive for a cost-effective application. It would be preferable to have multiple applications that can use the feature without the expense of having to explain everything with dynamic binding (higher implementation cost and expensive). There is also the danger of a collision, as can occur when an application is running in parallel with a second application if both applications try to access the preferred device at the same time.

This problem should be solved by inserting a layer between them that has an additional data structure.

FIG. 6 shows, schematically, CSTA Call Control Services used in the system from FIG. 2: (a) connection changes and (b) the corresponding event report 60 for the case of a "Consultation Service Request" [source: OpenScape Voice].

Connection-oriented CSTA Call Control Services under OSV (also known as: H18K) for the office number device D1 are transmitted while disclosing the currently connected physical preferred device *(here: D4) (D1|D4).

Figure 6B:
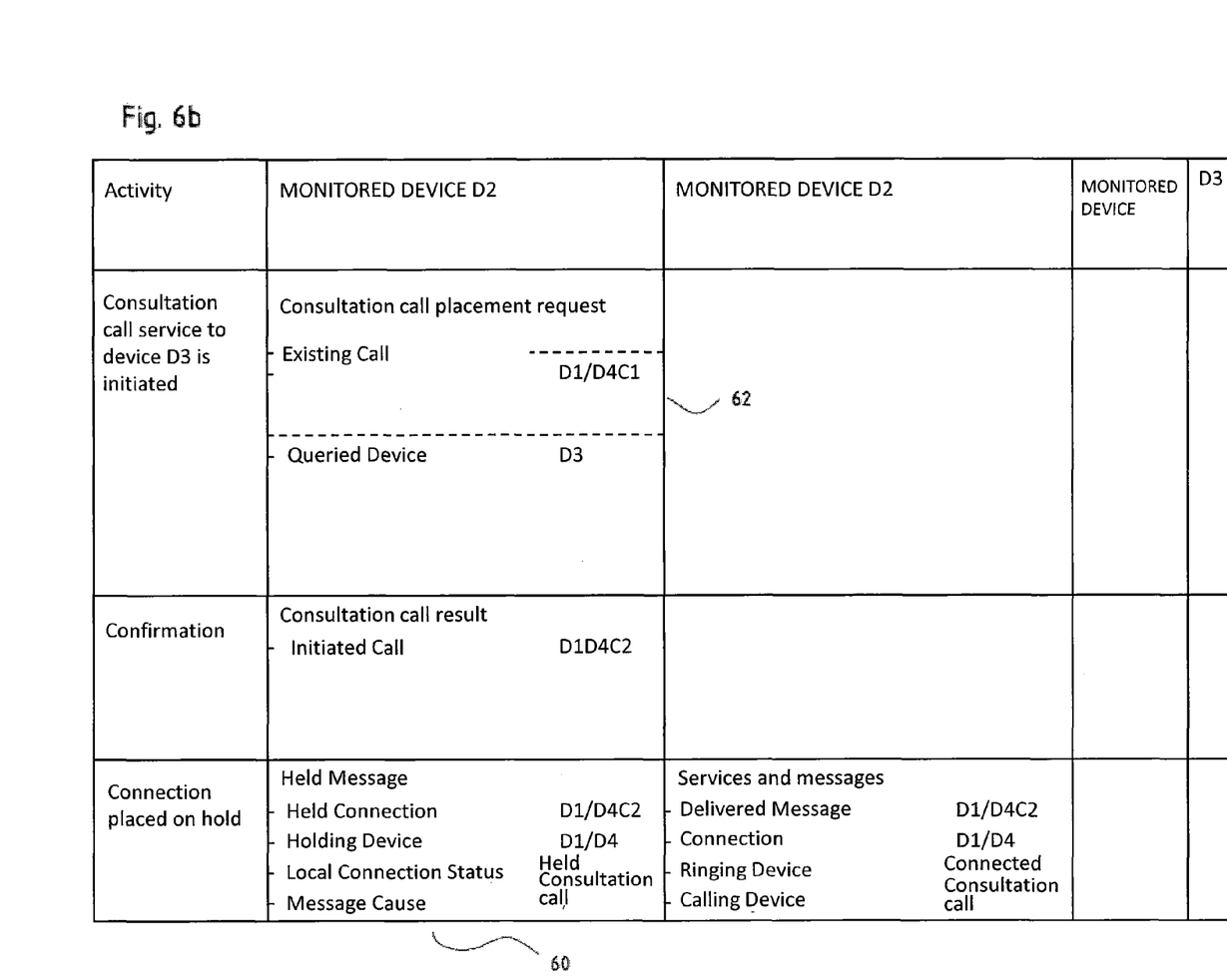
FIG. 6 schematically, CSTA Call Control Services used in the system from FIG. 2: (a) connection changes and (b) the corresponding event report for the case of a "Consultation Service Request" [source: OpenScape Voice]

A consultation call (without ONS addressing to the consulted device target) should be generated. This service holds an existing active call C1 (shown on the left side of FIG. 6(a) and FIG. 6(b), field 62) to a device in the hold queue and generates a new call C2 from the same device (shown on the right side of FIG. 6(a)).

OND format is used for D1 and D2, but not for D3. Thus, OSV should send an offered event (i.e., offer a call and OSV distributes the call) to D3 and let OS v3 select the device for D3 in a deflect request.

D1|D4—ONS Subscriber D1 uses OND D4.

D2|D5—ONS Subscriber D2 uses OND D5.

D3—ONS Subscriber D3 uses OND D6.

D1|D4 and D2|D5 are in Established state. Now D1|D4 holds callbacks with D3.

With a simplified event report for D1 to D3, the presentation is simplified from the application's standpoint. Afterwards, an application should make it possible to have a controlling influence on this connection without knowledge of the currently connected dynamically modifiable preferred device.

With an additional simplification step, the following can be implemented: As stated above, OpenScape Voice has bound the connections to each other. Binding the connections means that, when a service calls out, that precise connection must be known. In the data structure, the connection is not bound, only the device. D1 is bound to D3, and a link can be formed between connections D1 and D3. If so implemented, two different connections can exist: C1 and C2, in this case. While C1 always exists in OpenScape Voice, here C1 and C2 can also exist. Data storage makes it possible for this to be disconnected, then for just D1 and D3 to be linked and not the connection. In this way, the consultation call from the high-level application can be placed on D1, and the corresponding preferred device D4 is connected based on the data storage. Subsystem 102 in FIG. 1 is what the high-level application sends. D1, the interim layer, internally turns D1 into D4 and would place the consultation call directly to the preferred device. The consultation call is placed. ("Please wait" during the call), then back to the conversation or conference call.

For an incoming or outgoing call there is a 1:1 relationship, but if a third subscriber joins in or one is switching back and forth between subscribers, it becomes difficult.

According to this embodiment, there is an interim layer that handles this task for the application.

Definitions

The automatic conversion of the right column from the office number device to the preferred device (data structure) can take place in the embedded system or in an interim layer. As a result, the service request is sent from the application to the platform, and the platform recognizes at the switch whether it was successful (positive or negative result).

b) OpenScape Office

Connection-oriented CSTA Call Control Services such as consultation calls, call swapping, transfers, etc. are currently not supported for the office number device D1 (ONS) under OpenScape Office's CallMe Service.

Figure 7:
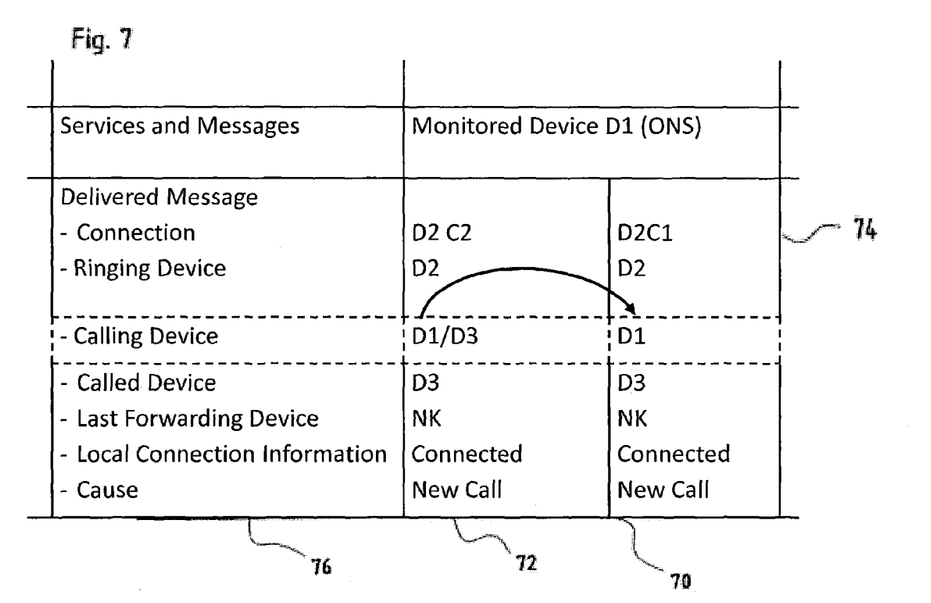
FIG. 7 schematically, a simplified CSTA Call Control Event Report used to execute an embodiment of a method according to the invention in the system from FIG. 2.

FIG. 7 shows, schematically, a simplified CSTA Call Control Event Report 76 used to execute an embodiment of a method according to the invention in the system from FIG. 2, in particular a simplified CSTA Call Control Event Report at the office number device (ONS). The CSTA Event Report 76 corresponds to the content of a data structure in which the relevant device, call, and connection information is stored.

The invention solves the problem in which, when the monitoring point is set on the office number device D1 (logical CTI device), the CTI messages, which are generated correspondingly at the platform level and oriented in reference to the preferred device (physical CTI device), are converted from the physically oriented content to the logical portion such that the high-level application sees only the logical CTI device (office number device—ONS) (see FIG. 7, field 74, column 70). Column 70 corresponds to a second assignment, and column 72 to a first assignment (see FIG. 5).

In CSTA XML, the conversion takes place as follows:

```
<callingDevice>N<+14084922343>; ond=+ 16504001800<calling Device>
=>      <callingDevice>N<+ 14084922343></calling Device>
```

From an application standpoint, this results in a simplified presentation that gives the CTI feature control without having knowledge about the currently bound (dynamically modifiable) preferred device.

Figure 8:
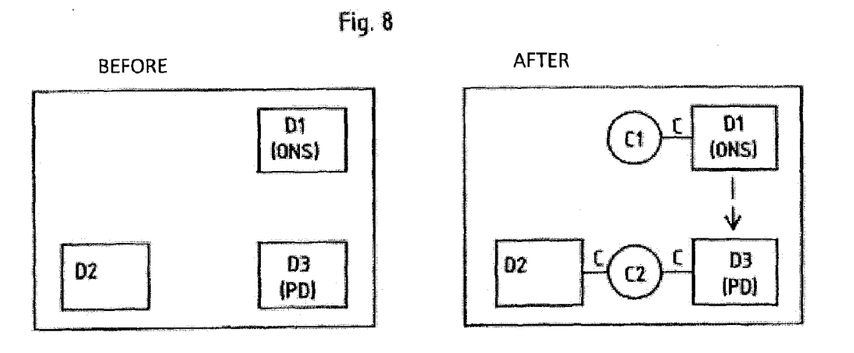
FIG. 8 schematically, a so-called dynamic binding of the embodiment from FIG. 7.

FIG. 8 shows, schematically, a so-called dynamic binding of the embodiment from FIG. 7. Compared to FIG. 3, here a dynamic bond for the devices is sufficient. Devices D1 and D3 are dynamically bound (ONS=>PD).

This process allows both the D1C1 and D3 C2 connections to be severed. Depending on the implementation, however, C1 can be identical to C2.

Figure 9:
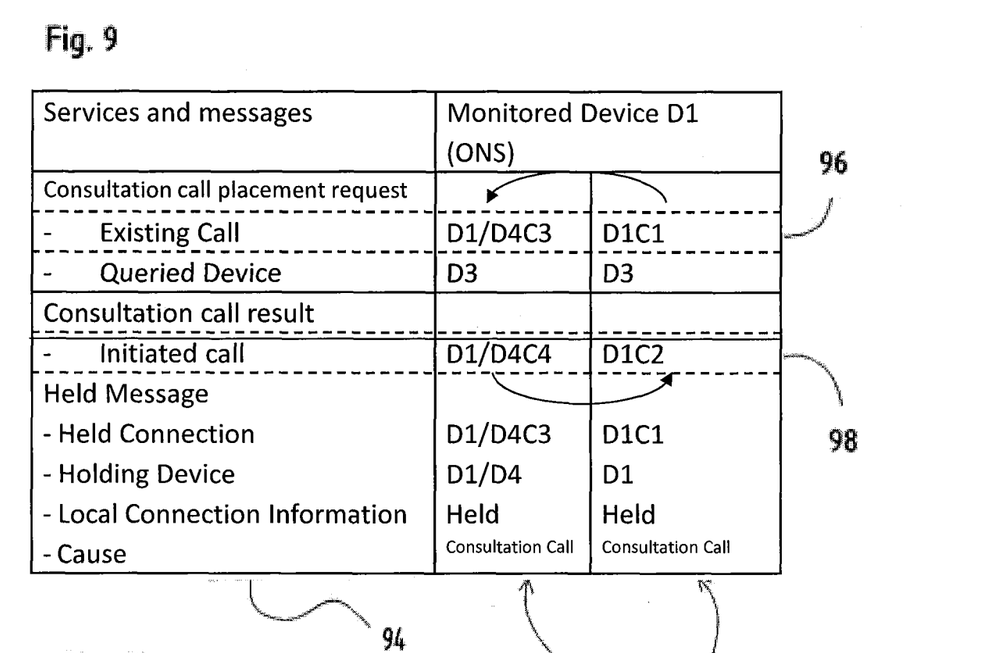
FIG. 9 schematically, a CSTA Call Control Event Report 94 for a simplified CSTA Call Control Service, used to execute an embodiment of a method according to the invention in the system from FIG. 2.

FIG. 9 shows, schematically, a CSTA Call Control Event Report 94 for a simplified CSTA Call Control Service, used to execute an embodiment of a method according to the invention in the system from FIG. 2, in particular a simplified CSTA Call Control Service on the office number device (ONS) in the case of a Consultation Service Request. The CSTA Event Report 94 corresponds to the content of a data structure in which the relevant device, call, and connection information is stored.

Field 96 shows the device (D1) and the connection (D4C3) for the existing call (existingCall), and field 98 shows the device (D1) and the connection (D4C4) for the new call (initiatedCall). Compared to FIG. 6, the invention now allows a high-level application to carry out a connection-oriented CSTA Call Control Service on the office number device D1 (see FIG. 9—column 90) without knowledge about the currently connected physical preferred device (here: D4 or D1/D4—see FIG. 6). Column 90 corresponds to a second assignment, and column 92 to a first assignment (see FIG. 6).

Automatic conversion of the right column 90 from the office number device D1 to the preferred device (D1=>D4) and the related call (C1=>C3) in the left column 92 can take place either in the platform or in a suitable piece of middleware.

As for CSTA Call Control Events, the positive and/or negative result is implemented accordingly. In connection with the conversion described here, now preferably status data relevant to CSTA Call Control Services, for the office number device (ONS or D1C1) as well as the preferred device (PD or D4C3), can be checked independently of each other. To do this, the preferred device must be involved in an active conversation (D4C3=connected) in order for a consultation call to be initiated successfully. Otherwise, the requested CSTA Call Control Service is rejected.

Linking D1 and D4 as well as C1 and C3 enables further checks. Here D1 is a desk phone, which is physically not busy, because the conversation is physically taking place on the device D4. This generates the problem that, when there is a consultation call to D1, D1 is not busy and an active conversation is required. D1 therefore accesses D4, D4 is involved in an active conversation, and a consultation call becomes possible. This means that respective checks for the Service can be made because of assigning D1 and D3 as well as C1 and C3.

Example

The described method can be used generally on existing types of terminals. OpenScape Voice has SIP and SIP-Q, meaning that it covers a much wider variety of terminal types.

FIGS. 7 and 9 are embodiments of the present invention. One Number Service from OpenScape Voice is possible for Call Control. Various functions from the CSTA standard, Chapter 14, can be implemented. Class 17 concerns Call Control.

Through this type of dynamic binding, i.e., through call-related dynamic binding, the described method can also be used for other services and event classes; see ECMA 269—applicable functions can be found in logical device features or in CII-associated features.

If the preferred device is located in its own node, the method disclosed here also allows parallel control of connection-related features on the preferred device.

Figure 10:
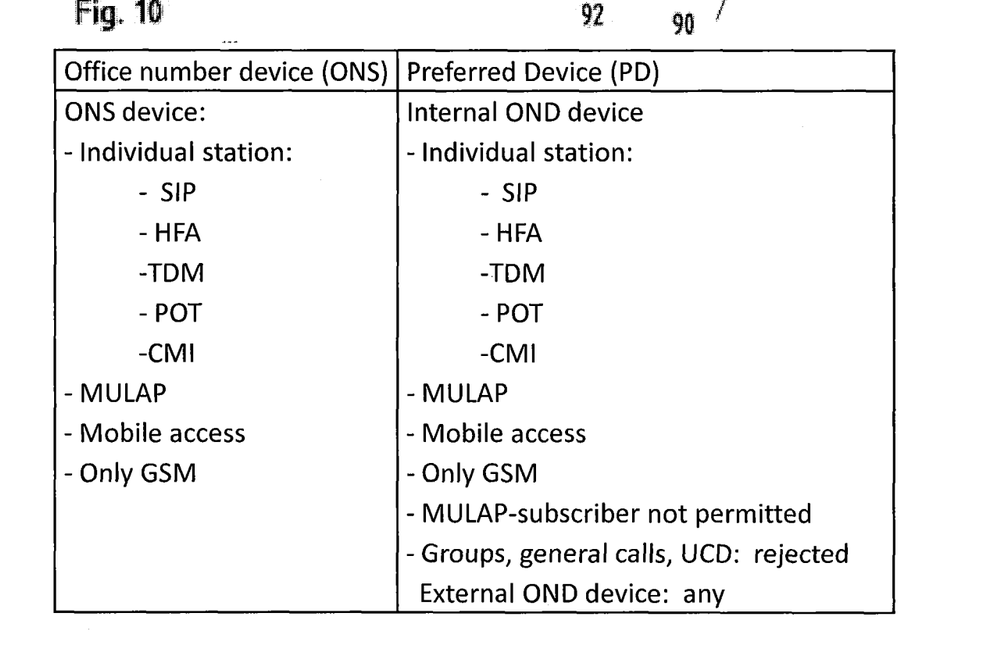
FIG. 10 the devices that are supported in OpenScape Office for the CallMe Service.

FIG. 10 shows the devices that are supported in OpenScape Office for the CallMe Service (Source: OpenScape Office).

If OpenScape Office does something, it must be checked only in SIP and SIP-Q, not the wide variety of terminal types that may exist in OpenScape Office. It compares to see which ONS devices and which preferred devices there can be.

The invention disclosed here is independent of any selected office number device (ONS) and preferred device (OND) and can therefore be used in any combination of the devices described above.

The method described here can also be used for other CSTA Services and event classes (e.g., logical device services and events).

Advantages of this invention include but are not limited to:
Better user control, simpler implementation algorithm (attractive to manufacturers).
Office number device and preferred device are independent of each other.
Simpler presentation layer: Using the modeling more to the right in the figure, it is possible to achieve not only Call Control but also Logical Device Services and the ability to do other intelligent checks, as well as conversion by the smart data storage and therefore linking.

It should be noted that the features of the invention described by referencing the presented embodiments, such as CTI server, media server, control program, data structures, event reports (the type and configuration of the parameters, control commands, protocols, and hardware components used, the arrangement of individual components relative to each other or the sequence of the respective method steps), can also be present in other embodiments or variations hereof, unless stated otherwise or prohibited for technical reasons. The types and combinations of features in individual embodiments do not necessarily always have to apply to all features of any related embodiment.

ABBREVIATIONS

ACD Automatic Call Distribution
API Application Programming Interface
CSTA Computer Supported Telecommunications Applications
C1, C2, C3 Connection
D1, D2, D3 (Subscriber) Device
ECMA-269 Standard ECMA-269. Services for Computer Supported Telecommunications Applications (CSTA) Phase III. 9th edition (December 2011).
FP Feature Processing
f( . . . ) Function of . . .
MS Media Server
MGCP Media Gateway Control Protocol
MLHG Multiple Hunt Group
OND One Number Service Device
ONS One Number Service
OSCC OpenScape Contact Center
OSMO Component of OSV
OSO OpenScape Office
OSV OpenScape Voice
PSTN Public Switched Telephone Network
SIP Session Initiation Protocol
SIP-Q Networking protocol CorNet-NQ tunneled through SIP
SST CSTA Service Single Step Transfer
Trk 1, Trk 2 (network) Trunk
UC Unified Communication application
UCD Universal Call Distribution (ACD solution in OpenScape Office and OpenScape Smart Office)

LIST OF FEATURE REFERENCES

10 Internal One Number Devices (ONDs)
12 External ONDs
12-1 External ONDs
12-2 External ONDs
12-3 External ONDs
20 Telecommunication system
22 Control program
24 Client PC (laptop)
26 ONS device (physical device)
28 OND device (ONS device: "OND")
40 Call
42, 42' Devices
44, 44' Connections
50 CSTA Event Report or data structure
52 Field
60 Event Report
62 Field
70 Second assignment
72 First assignment
74 Field
76 Control Event Report
90 Second assignment
92 First assignment
94 GSTA Call Control Event Report
96 Field
98 Field
100 Telecommunication system
102 Control program (sub-system)
106 Connection
108 Connection
104 Subscriber IDs
110 Media server
112 Softswitch
114 Terminal
116 Connections
118 Visited gateway
120 PSTN
122 Connections
124 Visited gateway
126 Softswitch
128 Connections
130 Second OSV softswitch

We claim:

1. A method for establishing a telecommunication connection for a user to whom a first communication terminal is assigned, comprising the following steps:
making available assignment information to a control program running on a Computer Telephony Integration (CTI) server for the purpose of establishing a telecommunication connection;
defining a first assignment in the assignment information for the first communication terminal as specified by a user, said first assignment defining an assignment of a second communication terminal to the first communication terminal, the assignment information also comprising a second assignment that is configured to identify the first communication terminal as a terminal in use by the user; and
establishing the telecommunication connection through the control program according to the first assignment, wherein the telecommunication connection is established through the second communication terminal instead of the first communication terminal via utilization of the first assignment of the assignment information while the first communication terminal is reported to the control program as being the only terminal used by the user in the established telecommunication connection via the second assignment of the assignment information.

2. The method of claim 1, comprising:
the CTI server calling up a data structure that defines the first assignment for the first communication terminal, wherein in the first assignment the second communication terminal is defined together with the first communication terminal.

3. The method of claim 2, wherein the data structure defines the second assignment, and wherein the second assignment defines only the first communication terminal as a calling device.

4. The method of claim 3, wherein the first communication terminal comprises a physical communication terminal as specified by the user and the second communication terminal comprises a preferred device, and
wherein, when the control program attempts to initiate a first call to the physical communication terminal, the CTI server automatically initiates a second call to the preferred device, based on the first assignment, wherein the second call appears in the control program as the first call to the physical communication terminal, based on the second assignment.

5. The method of claim 4, wherein a first connection ID is defined in the data structure in the first assignment, wherein the first connection ID is configured to make the second call to the second communication terminal, wherein a second connection ID is defined in the data structure in the second assignment, wherein the second connection ID indicates the first call to the first communication terminal.

6. The method of claim 2, wherein the CTI server carries out a Computer-Supported Telephony Applications (CSTA) Call Control Service in response to a command from the control program, wherein:
the data structure in the first assignment defines the first communication terminal together with a first connection ID as an existing call and defines the first communication terminal together with the second connection ID as an initiated call,
wherein the data structure in the second assignment defines a third connection ID as an existing call and a fourth connection ID as an initiated call, and
wherein the third and fourth connection IDs are related to the first communication terminal and correspond to different calls.

7. A non-transitory machine-readable medium comprising a computer program product that defines a method performed by a communication device that executes the computer program product, the method being the method of claim 1.

8. A system for establishing a telecommunication connection for a user to whom a first communication terminal is assigned, comprising:
a Computer Telephony Integration (CTI) server;
a first communication terminal assigned to the user;
a second communication terminal that can be assigned to the first communication terminal; and
a control program running on the CTI server for the purpose of establishing the telecommunication connection, in which a piece of assignment information is generated that defines a first assignment for the first communication terminal as specified by the user, with the first assignment defining an assignment of a second communication terminal to the first communication terminal and a second assignment configured such that only the first communication terminal is identified as a communication terminal the user is using for a telecommunication connection; wherein the control program is configured such that the telecommunication connection is established by the control program according to the assignment information such that the second communication terminal is connected in the telecommunication connection instead of the first communication terminal via the first assignment while the first communication terminal is reported to the control program as being the only terminal used by the user in the established telecommunication connection via the second assignment.

9. The system of claim 8, wherein the assignment information comprises a data structure that defines the first assignment for the first communication terminal, wherein in the first assignment the second communication terminal is defined together with the first communication terminal.

10. The system of claim 9, wherein the data structure defines the second assignment, and wherein the second assignment defines only the first communication terminal as a calling device.

11. The system of claim 9, wherein a first connection ID is defined in the data structure for the first assignment, wherein the first connection ID is configured to facilitate making of a second call using the second communication terminal for establishment of the telecommunications connection, wherein a second connection ID is defined in the data structure in the second assignment, wherein the second connection ID indicates a first call made via only the first communication terminal was performed for use in establishment of the telecommunications connection even though the second communication terminal is utilized in the telecommunication connection.

12. The system of claim 8, wherein the control program is configured to attempt to initiate a first call to the first communication terminal and the CTI server is configured to automatically initiate a second call to the second communication terminal based on the first assignment, wherein the second call appears in the control program as the first call to the first communication terminal based on the second assignment.

13. The system of claim 12, wherein a first connection ID is defined in the first assignment, the first connection ID configured to facilitate establishment of the second call using the second communication terminal for establishment of the telecommunications connection; and wherein a second connection ID is defined in the second assignment, wherein the second connection ID is configured to indicate that the first call was made via the user only using the first communication terminal for establishment of the telecommunications connection even though the second communication terminal is utilized in the telecommunication connection.

14. The system of claim 8, wherein the first communication terminal comprises a physical communication terminal and the second communication terminal is a telephone or a cell phone.

15. The system of claim 8, wherein the CTI server is configured to carry out a Computer-Supported Telephony Applications (CSTA) Call Control Service in response to a command from the control program.

16. The system of claim 15, wherein the first assignment defines the first communication terminal together with a first connection ID as an existing call and defines the first communication terminal together with a second connection ID as an initiated call;

wherein the second assignment defines a third connection ID as an existing call and a fourth connection ID as an initiated call, the third and fourth connection IDs being related to the first communication terminal and correspond to different calls.

17. The system of claim 8, wherein the first assignment links the second communication terminal to the first communication terminal and the second assignment identifies the first communication terminal as only a single calling terminal used by the user for establishment of the telecommunications connection.

18. The system of claim 8, wherein the telecommunications connection is a callback communication connection.

* * * * *